United States Patent [19]
Frick

[11] Patent Number: 5,984,094
[45] Date of Patent: Nov. 16, 1999

[54] HINGE FOR STORAGE MEDIA PACKAGE

[75] Inventor: Markus W. Frick, Syracuse, N.Y.

[73] Assignee: Frick Management Group Limited, Syracuse, N.Y.

[21] Appl. No.: 08/965,823

[22] Filed: Nov. 7, 1997

[51] Int. Cl.[6] .................................................. B65D 85/57
[52] U.S. Cl. ...................................... 206/308.1; 220/840
[58] Field of Search ................................. 206/307, 308.1, 206/309, 310, 311; 220/337, 338, 340, 343, 784, 836, 840

[56] References Cited

U.S. PATENT DOCUMENTS

| | | |
|---|---|---|
| 3,095,965 | 7/1963 | Stahl et al. ................................. 220/337 |
| 4,702,369 | 10/1987 | Philosophe . |
| 5,022,529 | 6/1991 | Kang ........................................ 220/343 |
| 5,310,053 | 5/1994 | Lowry et al. . |
| 5,379,890 | 1/1995 | Mahler . |
| 5,427,236 | 6/1995 | Kramer . |
| 5,593,031 | 1/1997 | Uchida . |
| 5,657,893 | 8/1997 | Hitchings ................................. 220/338 |

FOREIGN PATENT DOCUMENTS 2143210  2/1985  United Kingdom .

*Primary Examiner*—Jim Foster
*Attorney, Agent, or Firm*—Eugene Stephens & Associates

[57] ABSTRACT

A new hinge for storage media packages and storage devices, especially for use in packages for disc-shaped storage media, includes a hinge pin formed as part of a cover of the package. The hinge pin is inserted into hinge pin receptacles formed on a support plate of the package. The support plate is held by a base plate. When the hinge pin is inserted in the receptacles and the support plate is inserted into the base plate, the receptacles are prevented from expanding, thus locking the hinge pin in the receptacles and locking the cover on the package. The hinge pin locks the support plate in the base plate by projections extending from the receptacles and engaging an undercut of the base plate. Hinge pin supports are formed on projections of the cover and are spaced so that each support is adjacent one or more receptacles.

18 Claims, 18 Drawing Sheets

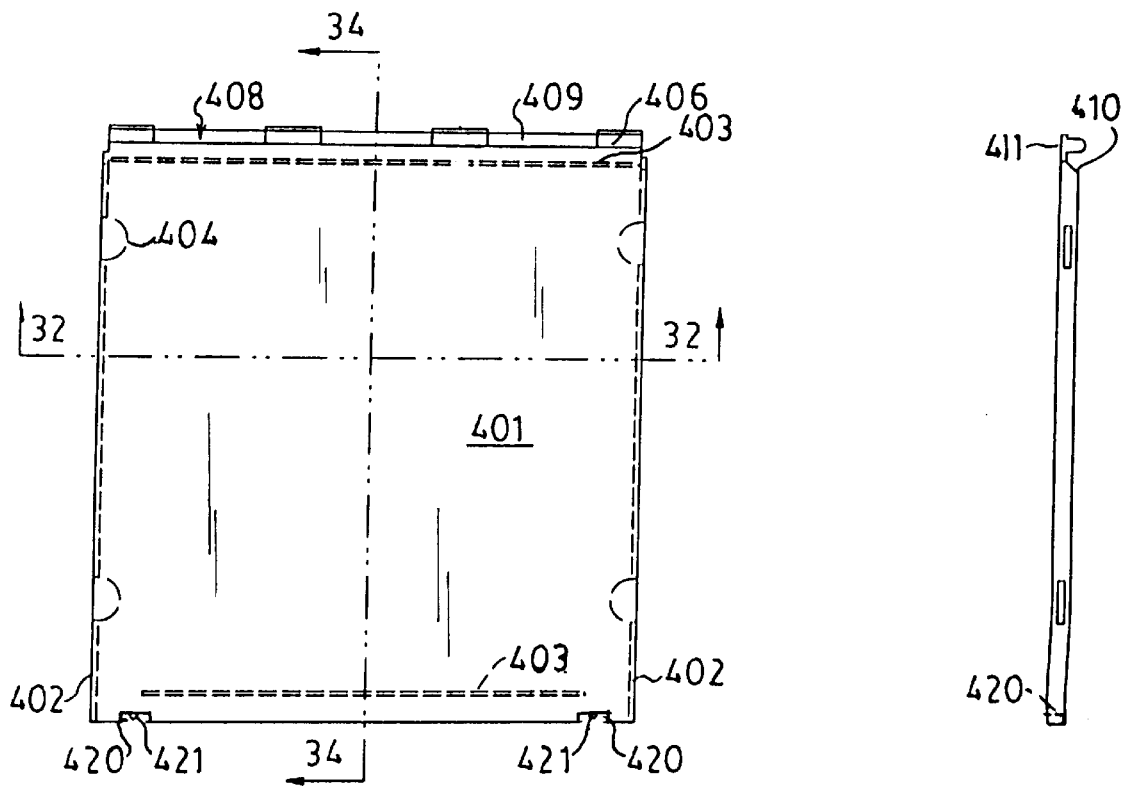
FIG. 30
FIG. 33
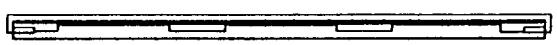
FIG. 31
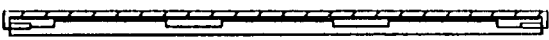
FIG. 32

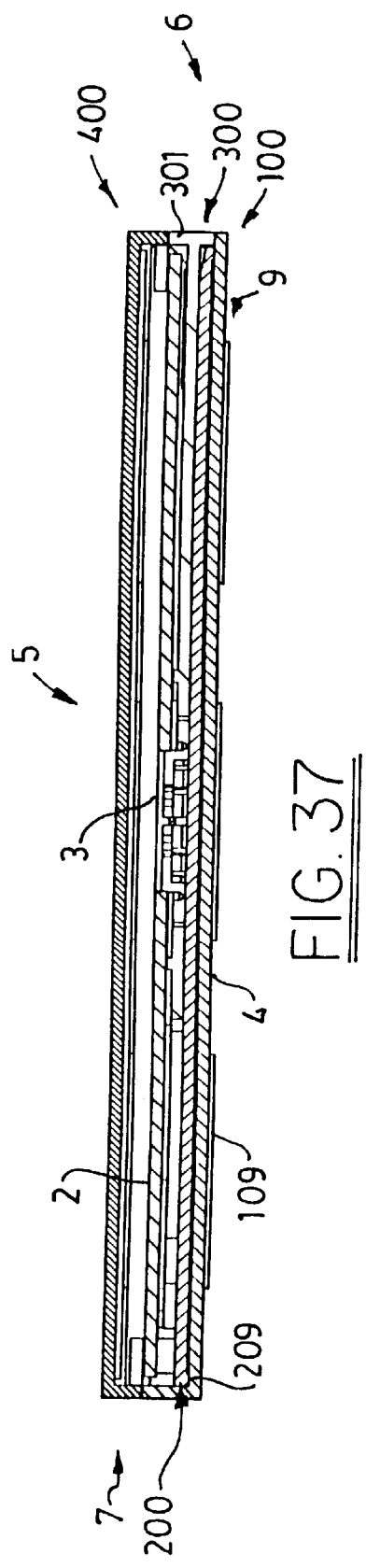
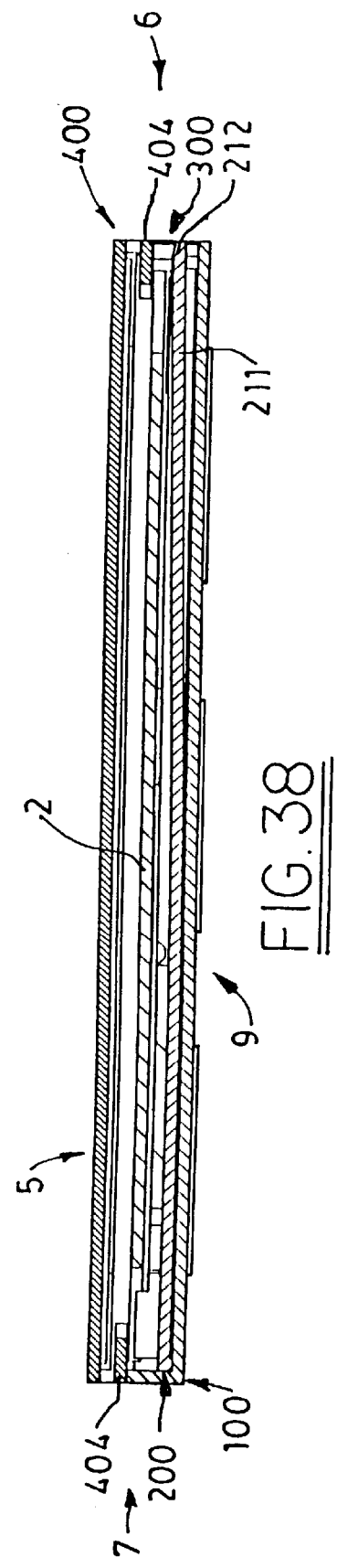

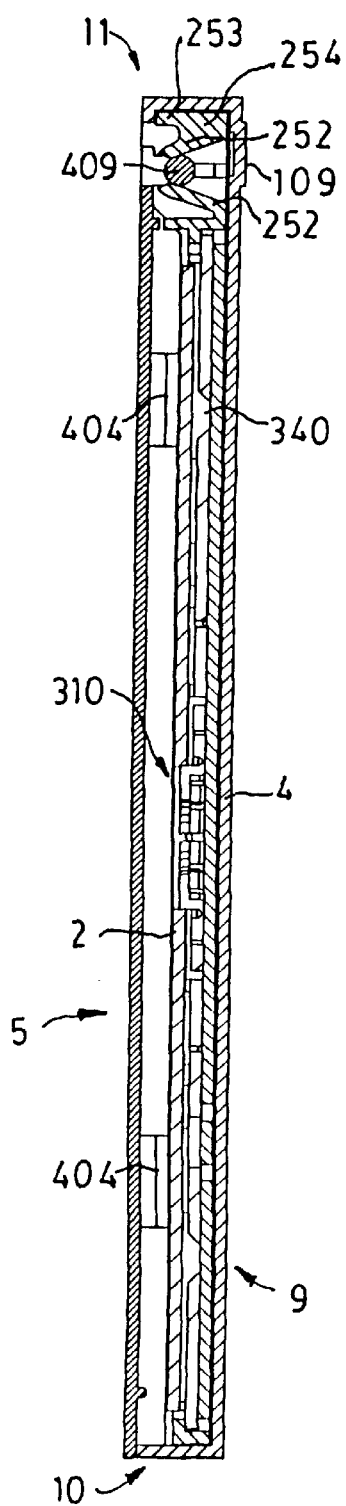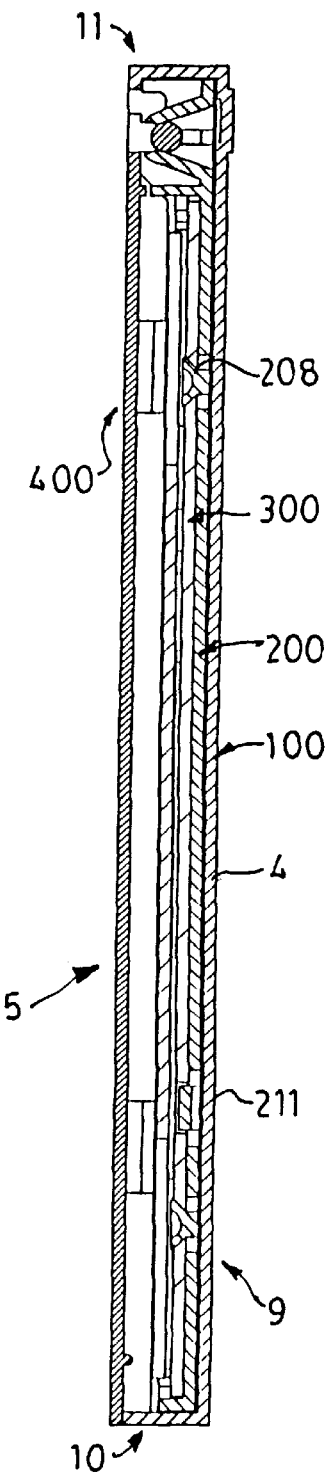
FIG. 39
FIG. 40

HINGE FOR STORAGE MEDIA PACKAGE

TECHNICAL FIELD

The invention relates to the field of packaging for storage media, especially disc-shaped storage media. The invention particularly relates to hinges of packaging for optical discs, such as compact discs (CDs) and digital video discs (DVDs).

BACKGROUND OF THE INVENTION

Prior art storage media packages, such as jewel cases for audio CDs and CD-ROMs, have suffered a number of disadvantages. (I will refer to CDs in this specification, but the discussion of the prior art and the invention also applies to other disc-shaped records and storage media in general.) The most widely used jewel case comprises a top cover pivotably connected to a bottom cover, the bottom cover holding a disc carrier. The top cover typically has extensions with protrusions that fit into holes on the bottom cover to provide the pivot connection. However, the extensions snap off easily, and the protrusions often pop out of the holes into which they are inserted. The resulting connection is not very secure, and the particular construction and type of material from which the jewel cases are usually made render the connection easily broken.

The disc carrier is typically held in the bottom cover by a press or snap-in fit. The carrier includes a raised cylindrical portion that spaces the recorded surface of the stored disc from the carrier itself. A set of raised, radially arranged fingers formed on the raised cylindrical portion holds the disc in place by an interference fit with the center hole of the disc. To free the disc, the user is supposed to depress the tops of the fingers while lifting the edges of the stored disc. As a result of the construction of prior art packages, this operation can be difficult to complete, especially for the small-handed, and often results in dropped discs or contact with the recorded surface.

The ubiquity of this type of jewel case has resulted in a standard set of booklets and informational cards (so-called "C-cards") that are inserted with the storage media, especially for audio CDs. Thus, any redesign of the jewel case that requires something other than the standard booklet or C-card will result in increased publication costs and will consequently have a more difficult time becoming established in the marketplace.

Several attempts at redesigns of this "standard" jewel case have been made. The best attempt is that by Philosophe (U.S. Pat. No. 4,702,369) and includes a disc carrier that slides away from the pivot between the top and bottom covers, allowing the stored disc to be accessed in two ways: by the conventional opening of the cover and by sliding the carrier out of the jewel case. This configuration also allows for stacking of the jewel cases for more compact storage of a plurality of jewel cases, yet also allows access to the stored discs without removing a jewel case from the stack. Unfortunately, this configuration suffers from several drawbacks.

Firstly, the C-card that would be used in this newer jewel case would be non-standard or would be easily damaged when the carrier was slid out of the jewel case. If a standard C-card were used, it would ride on the carrier with its printed surface facing the bottom cover. As a result, the printed surface of the C-card could be scratched or torn from the sliding of the carrier in and out of the jewel case. If a non-standard C-card were used, it could remain in the bottom cover, but might still be torn by the sliding carrier. Additionally, as mentioned above, a non-standard C-card would be more costly and would decrease the marketability of the jewel case.

Secondly, Philosophe still relies on the standard type of hinge connection. As mentioned above, this type of hinge comes apart or breaks quite easily. Consequently, the reliability and durability of the Philosophe jewel case hinge are not what most consumers would desire. Philosophe's jewel case hinge is therefore no improvement over that of the standard jewel case.

Thirdly, the carrier Philosophe uses includes the standard radially arranged fingers for holding the disc. Thus, once the carrier is slid out of the jewel case, the user must still perform the often difficult task of depressing the tabs while lifting the edges of the stored disc. As mentioned above, this maneuver can result in a dropped disc or contact with the recorded surface, potentially damaging the disc. Further, when the stored disc is being removed from a stack of jewel cases as suggested by Philosophe, the maneuver could result in toppling the whole stack, resulting in a big mess, possible breakage of the jewel cases, and aggravating the user. Therefore, the sliding carrier of Philosophe only slightly improves on the standard jewel case.

SUMMARY OF THE INVENTION

My package for storage media, particularly disc-shaped storage media such as compact discs, overcomes the drawbacks of the prior art packages by providing a sliding disc carrier that uses standard C-cards, including a better hinge arrangement, and including an automatic disc release mechanism. The package has greater structural integrity than prior art packages, reducing or eliminating the risk of the package falling apart accidentally. My sliding disc carrier is spring biased and folds down when extended to allow easy removal of the disc, especially when my automatic disc release mechanism is used. The use of standard C-cards results in the elimination of the barrier to marketability that prior art packages using non-standard C-cards suffered. In addition, my package keeps the C-card safely away from the sliding carrier, preserving the C-card and the information printed thereon while increasing the potential usable life and user-friendliness of the package.

My hinge arrangement provides more than adequate angular separation of the cover from the rest of the package for easy access to the disc while providing a stronger, more reliable pivot connection between the cover and the rest of the package. I eliminate the standard extensions and their protrusions, and I achieve a more positive engagement between the hinge components. The hinge uses a hinge pin that is locked in place upon assembly of the package, essentially eliminating the chance of the cover falling off the package when it is opened. Thus, like my sliding disc carrier construction, my hinge arrangement increases the potential usable life of the package. An additional feature of my hinge arrangement is that it can include integral recesses used in stacking a plurality of packages.

I include an automatic disc release mechanism that uses a series of radially arranged fingers on my sliding carrier to engage the stored disc in a fashion similar to that of the prior art. However, I form the fingers so that they are cantilevered and extend below the carrier to interact with other parts of the package to automatically release the disc when the disc is exposed. My release mechanism can be arranged to release the disc when the sliding carrier has slid out of the package, when the cover of the package has been opened, or both. This eliminates the difficult maneuver required by prior art packages, especially the standard CD jewel case, to remove the disc from the carrier. When the disc is replaced on the carrier, the fingers automatically secure the disc to the carrier as the cover is closed or the carrier is returned to the package. My release mechanism can also be arranged to reduce the force with which the disc is held when the carrier is fully inserted in the package, reducing the effort a user requires to remove the disc when the cover is opened.

I prefer to form my package from resinous materials, such as plastics, for economy and ease of manufacture. Additionally, I prefer to use plastics recycled from consumer waste, such as beverage containers, to reduce pollution of the environment. However, I recognize that the use of such materials results in an increase in manufacturing cost and therefore provide for the use of other materials for those of a less philanthropic mind set.

DESCRIPTION OF THE DRAWINGS

FIG. 30 is a top view of the cover of FIG. 29.

FIG. 31 is a rear view of the cover of FIGS. 29 and 30.

FIG. 32 is a cross section of the cover taken along line 32—32 of FIG. 30.

FIG. 33 is a side view of the cover of FIGS. 29 and 30.

FIG. 37 is a cross section of the assembled package taken along line 37—37 of FIG. 36.

FIG. 38 is a cross section of the assembled package taken along line 38—38 of FIG. 36.

FIG. 39 is a cross section of the assembled package taken along line 39—39 of FIG. 36.

FIG. 40 is a cross section of the assembled package taken along line 40—40 of FIG. 36.

DESCRIPTION OF THE INVENTION

Figure 1:
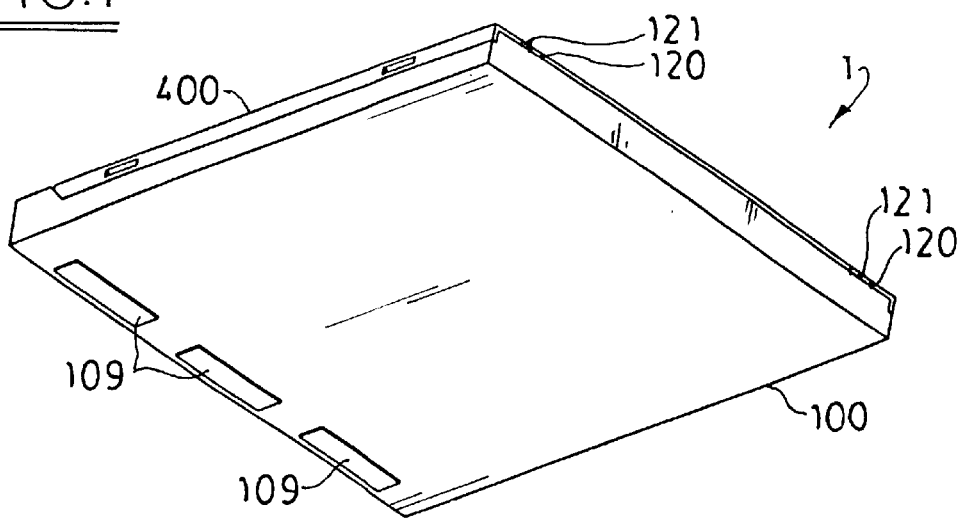
FIG. 1 is a bottom elevational view of an embodiment of my invention when it is closed.
Figure 2:
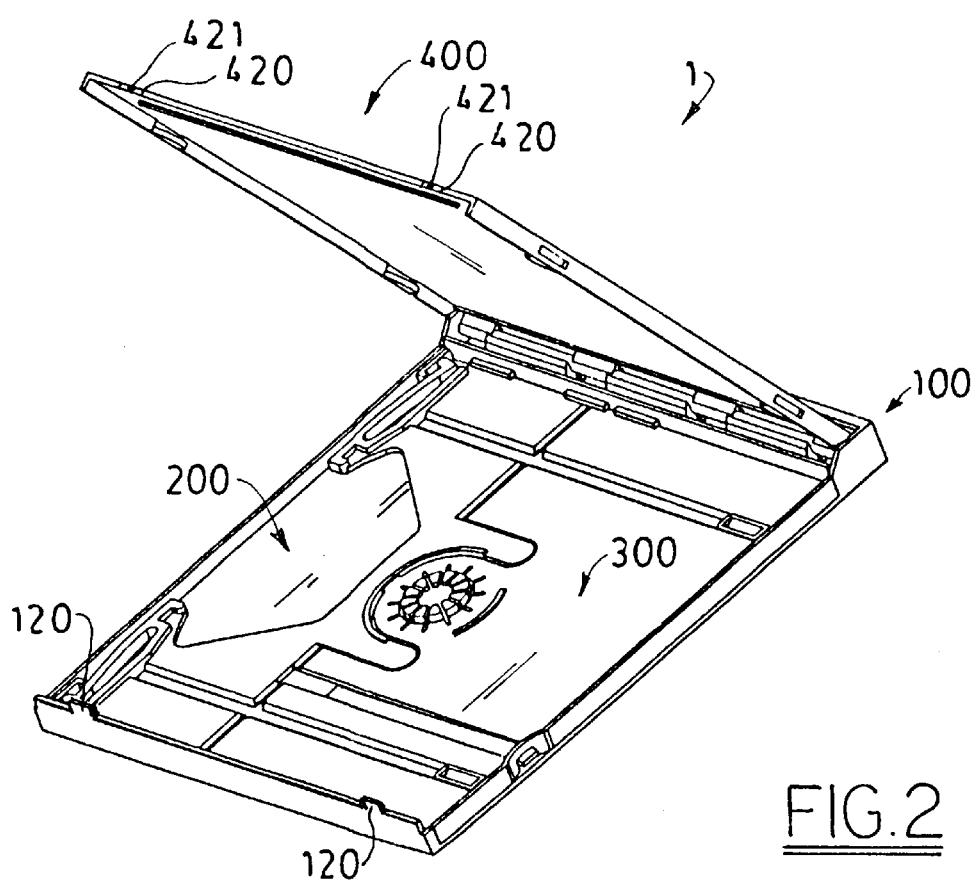
FIG. 2 is a top elevational view of an embodiment of my invention from the side through which the carrier plate slides with the cover partially opened.
Figure 3:
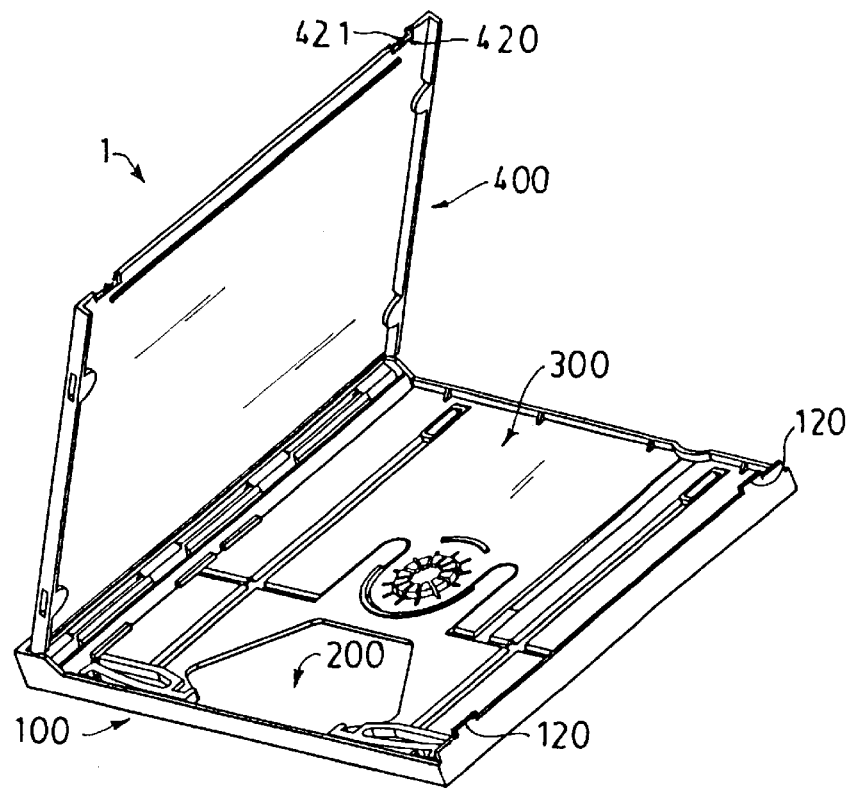
FIG. 3 is a top elevational view of an embodiment of my invention from the fixed side with the cover partially opened.
Figure 4:
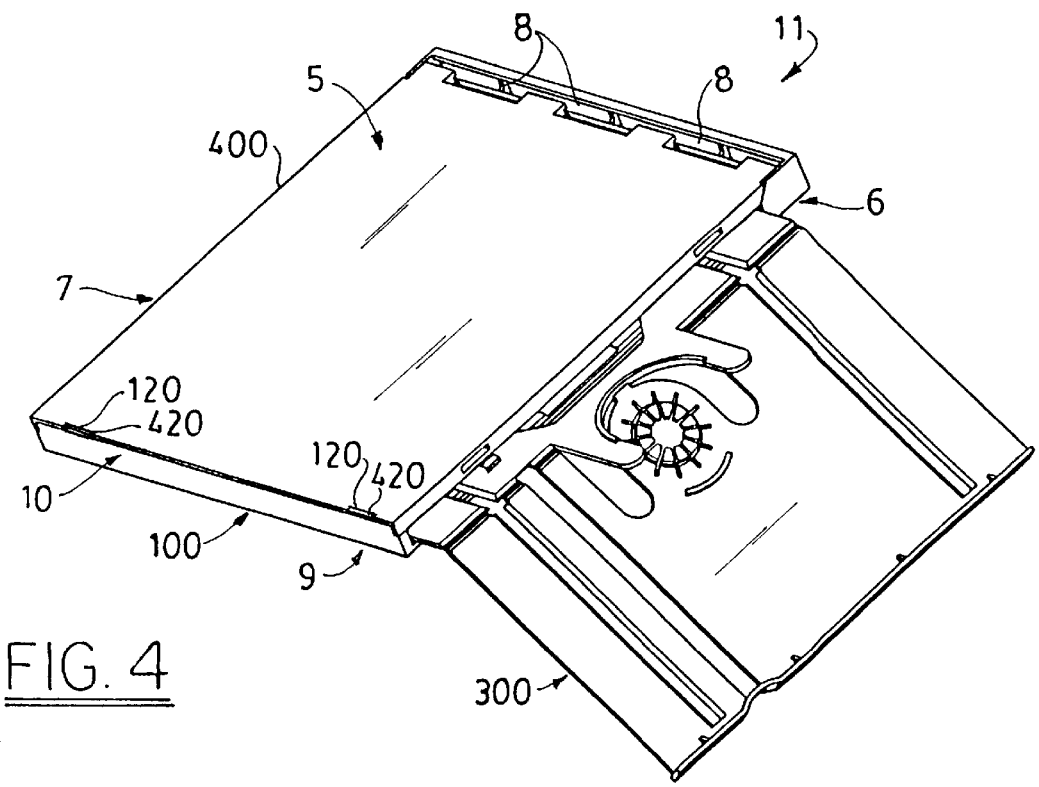
FIG. 4 is a top elevational view of an embodiment of my invention from the side through which the carrier plate slides with the cover closed and the carrier plate fully extended and folded down.
Figure 5:
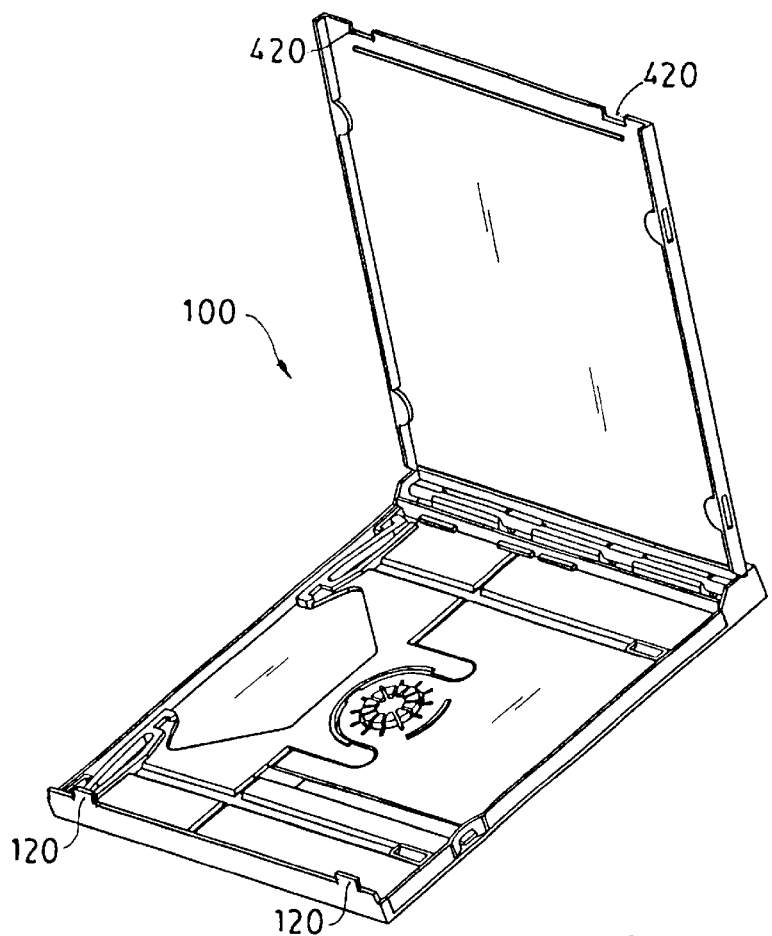
FIG. 5 is a top elevational view of an embodiment of my invention from the side through which the carrier plate slides with the cover fully opened.
Figure 6:
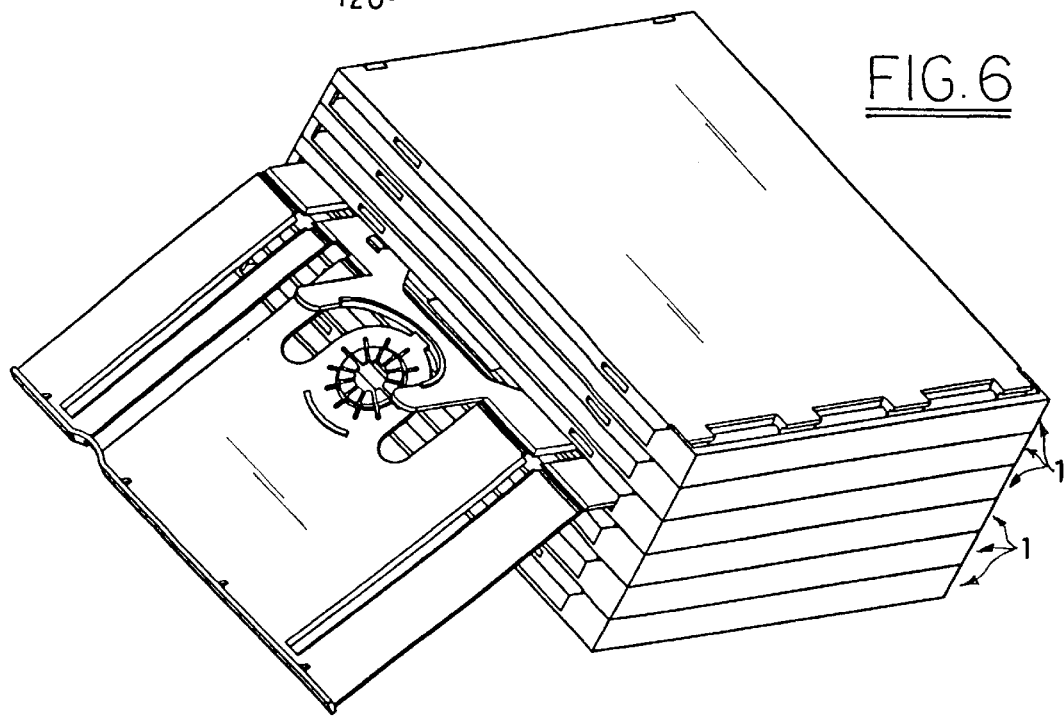
FIG. 6 is a top elevational view of a plurality of the packages of my invention showing the manner in which they can be securely stacked while retaining easy access to the contents via the sliding carrier plate.
Figure 7:
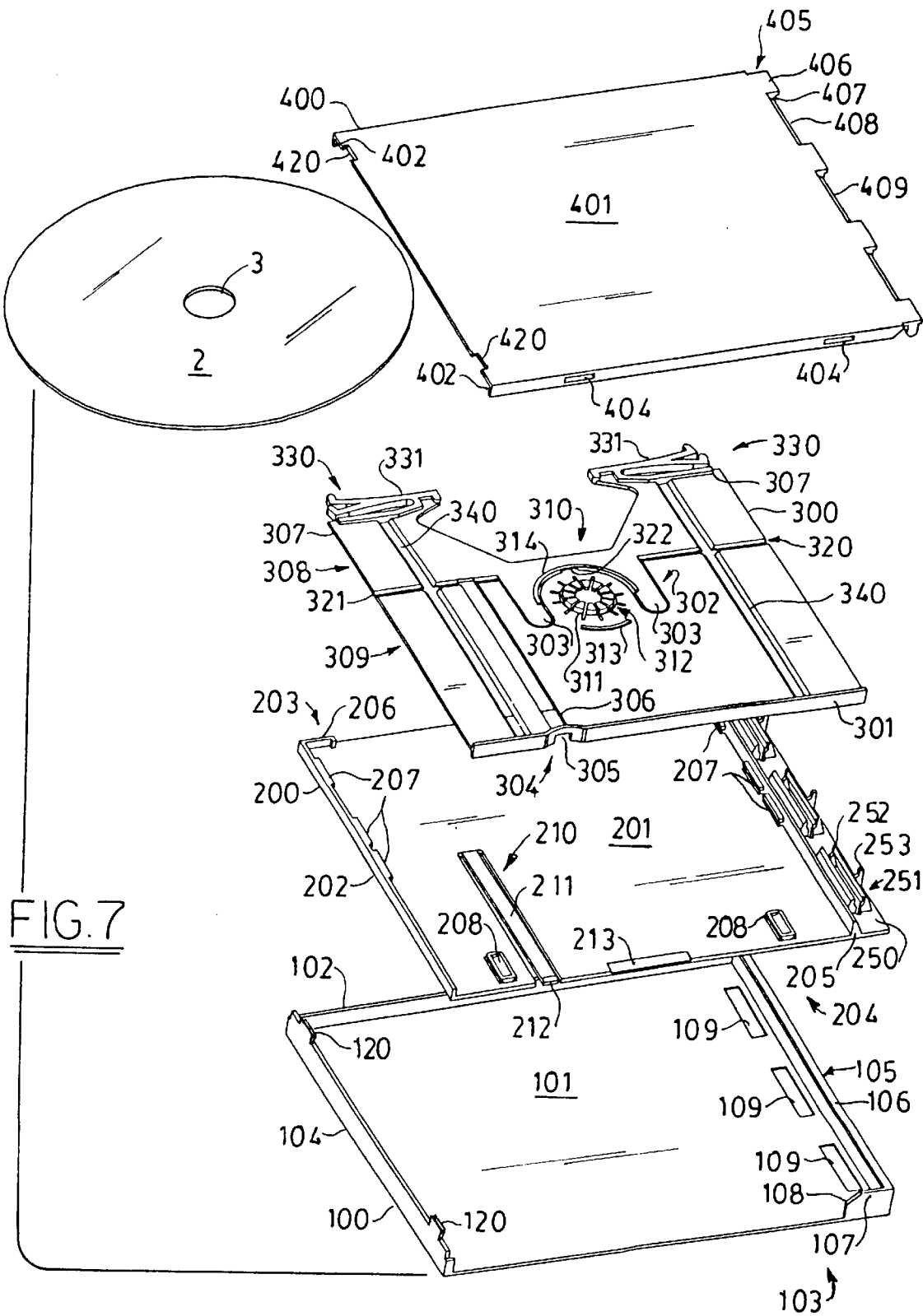
FIG. 7 is an exploded view of an embodiment of my invention.
Figure 10:
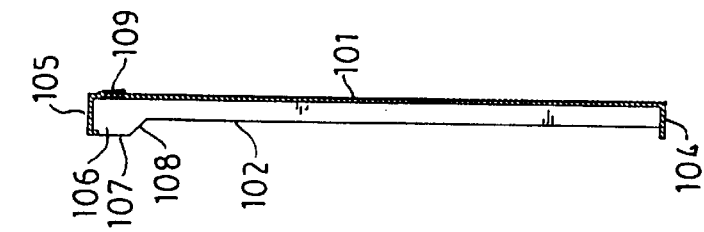
FIG. 10 is a cross section of my base plate taken along line 10—10 in FIG. 8.
Figure 9:
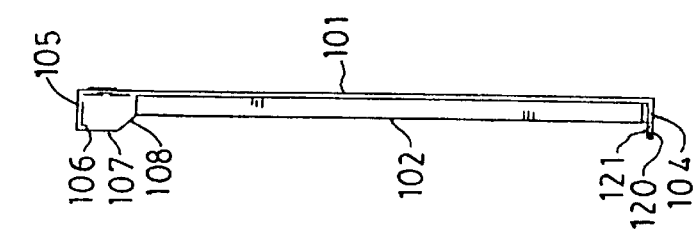
FIG. 9 is a side view of my base plate as shown in FIG. 8.
Figure 8:
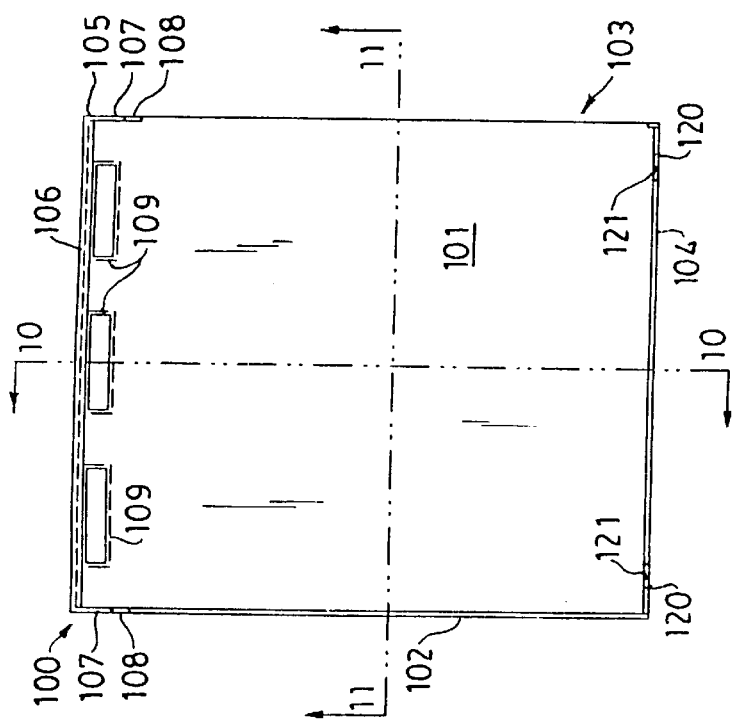
FIG. 8 is a top view of the base plate according to an embodiment of my invention.
Figure 11:
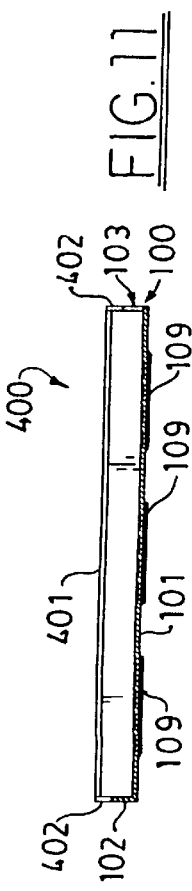
FIG. 11 is a cross section of my base plate taken along line 11—11 in FIG. 8.
Figure 12:
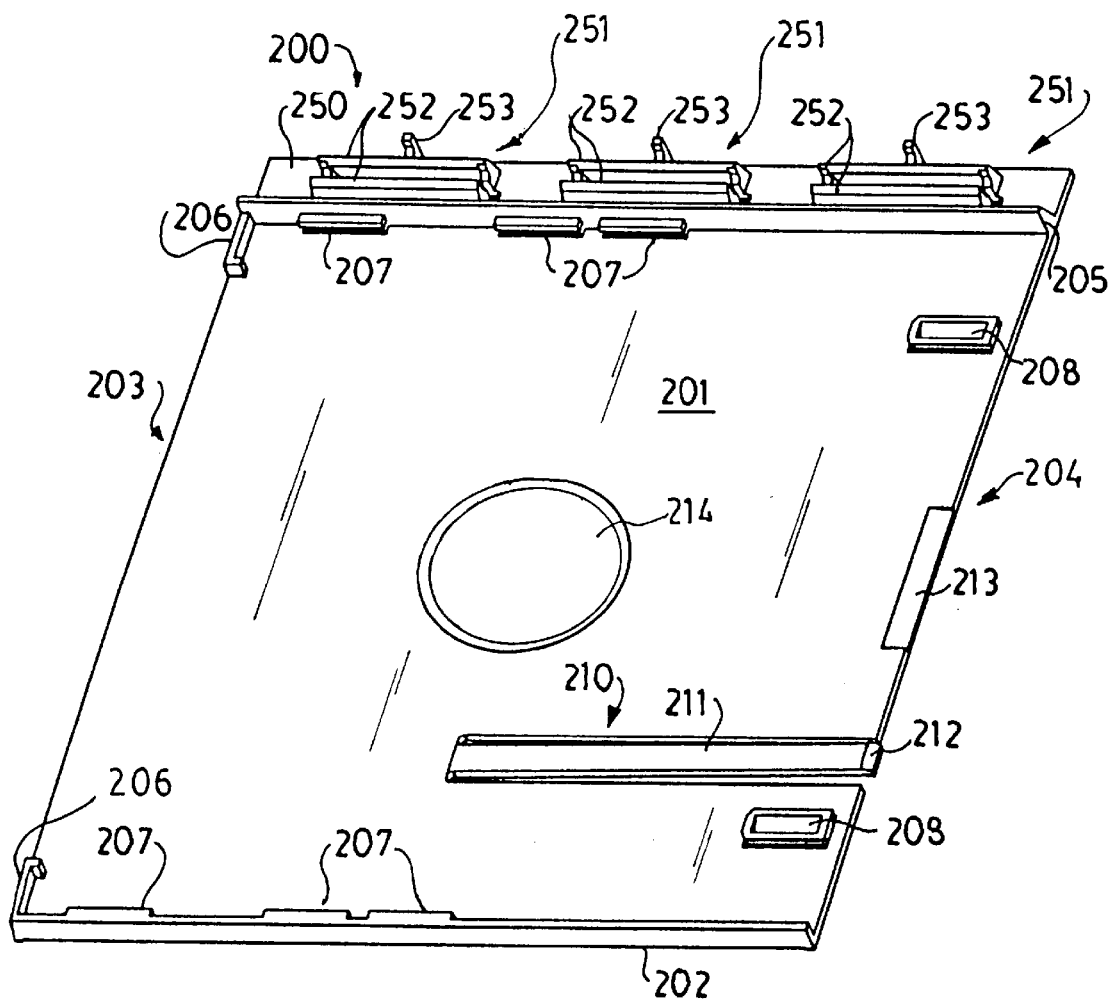
FIG. 12 is a top elevational view of the support plate of an embodiment of my invention.
Figure 13:
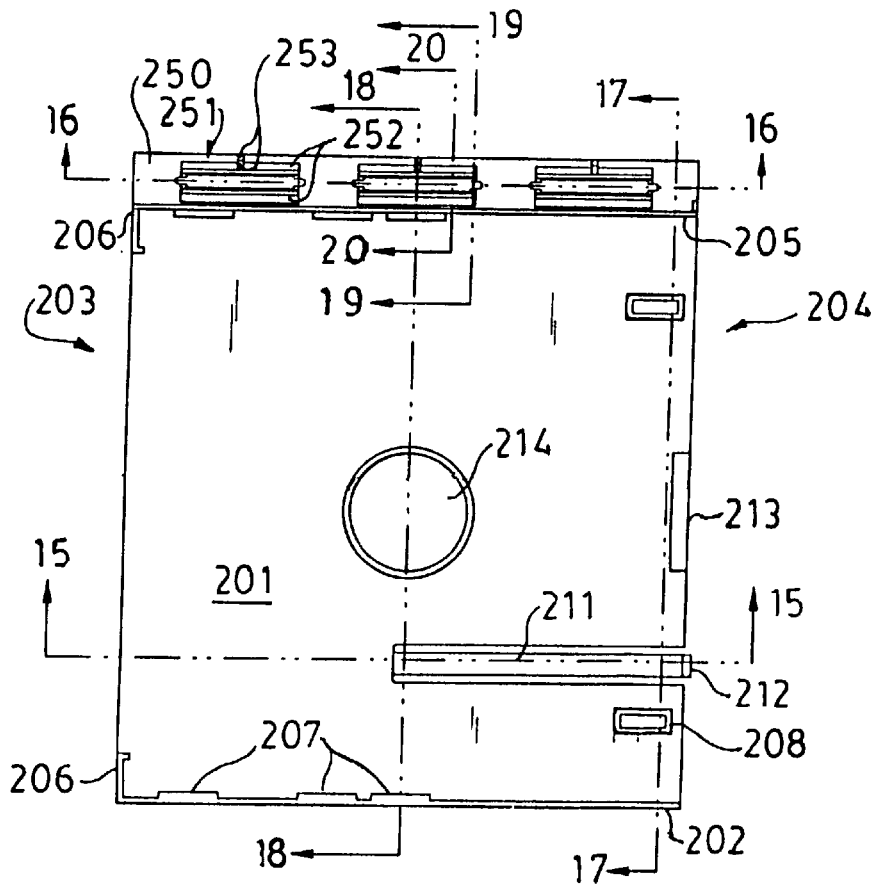
FIG. 13 is a top view of the support plate of FIG. 12.
Figure 14:
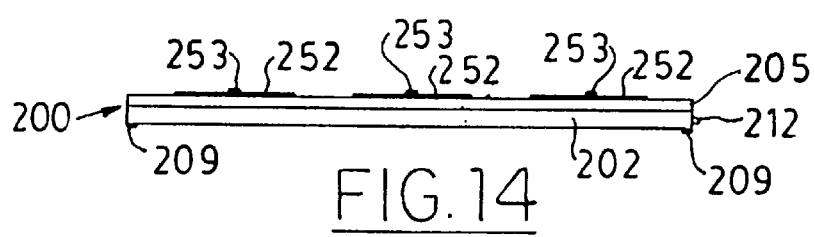
FIG. 14 is a side view of the support plate of FIGS. 12 and 13.
Figure 15:
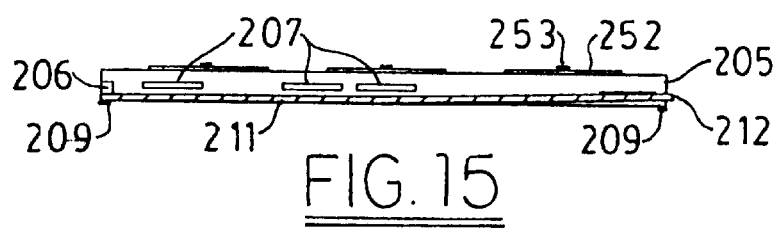
FIG. 15 is a cross section of the support plate of FIG. 13 taken along line 15—15 in FIG. 13.
Figure 16:
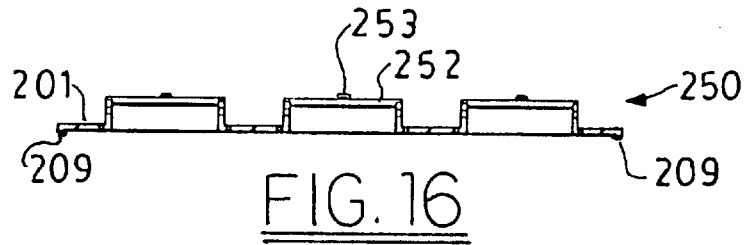
FIG. 16 is a cross section of the support plate of FIG. 12 taken along line 16—16 of FIG. 12.
Figure 20:
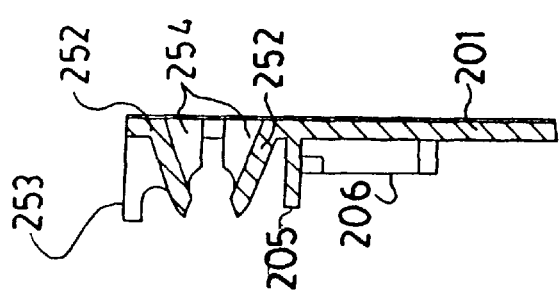
FIG. 20 is a close-up cross section of the support plate of FIG. 12 taken along line 20—20 of FIG. 12.
Figure 19:
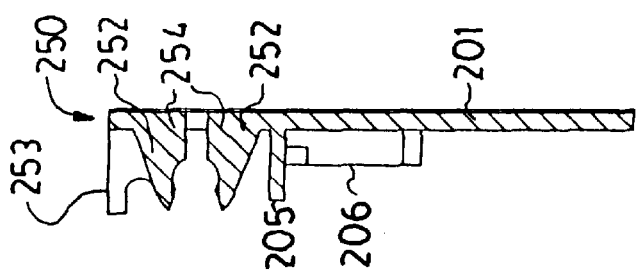
FIG. 19 is a close-up cross section of the support plate of FIG. 12 taken along line 19—19 of FIG. 12.
Figure 18:
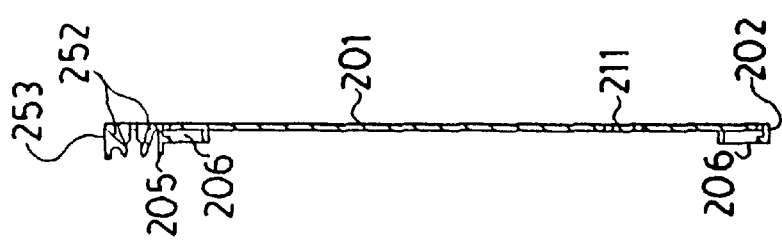
FIG. 18 is a cross section of the support plate of FIG. 12 taken along line 18—18 of FIG. 12.
Figure 17:
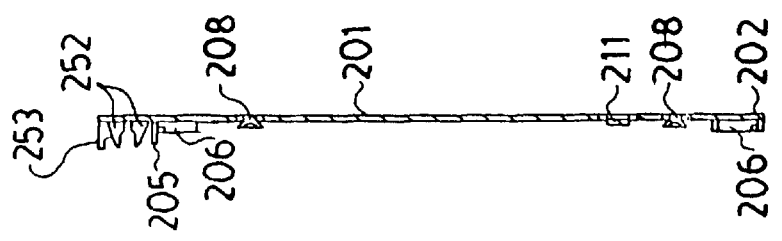
FIG. 17 is a cross section of the support plate of FIG. 12 taken along line 17—17 of FIG. 12.
Figures 21, 26:
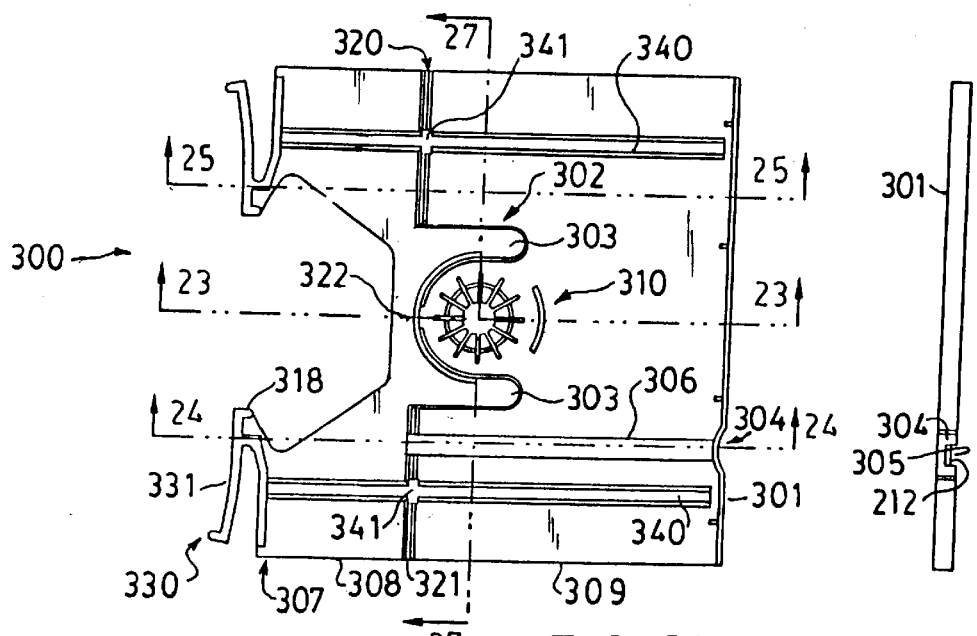
FIG. 21 is a top view of the carrier plate of an embodiment of my invention.
FIG. 26 is a side view of the carrier plate of FIG. 21 from the exterior side of the carrier plate.
Figure 22:
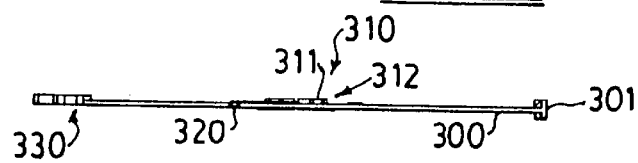
FIG. 22 is a side view of the carrier plate of FIG. 21.
Figure 23:
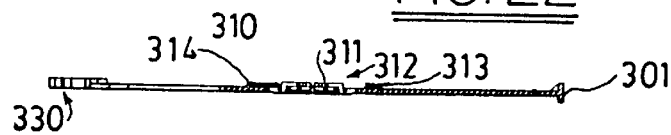
FIG. 23 is a cross section of the carrier plate of FIG. 21 taken along line 23—23 of FIG. 21.
Figure 24:
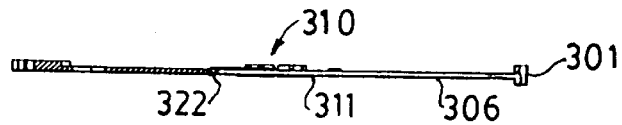
FIG. 24 is a cross section of the carrier plate of FIG. 21 taken along line 24—24 of FIG. 21.
Figure 25:
FIG. 25 is a cross section of the carrier plate of FIG. 21 taken along line 25—25 of FIG. 21.
Figure 27:
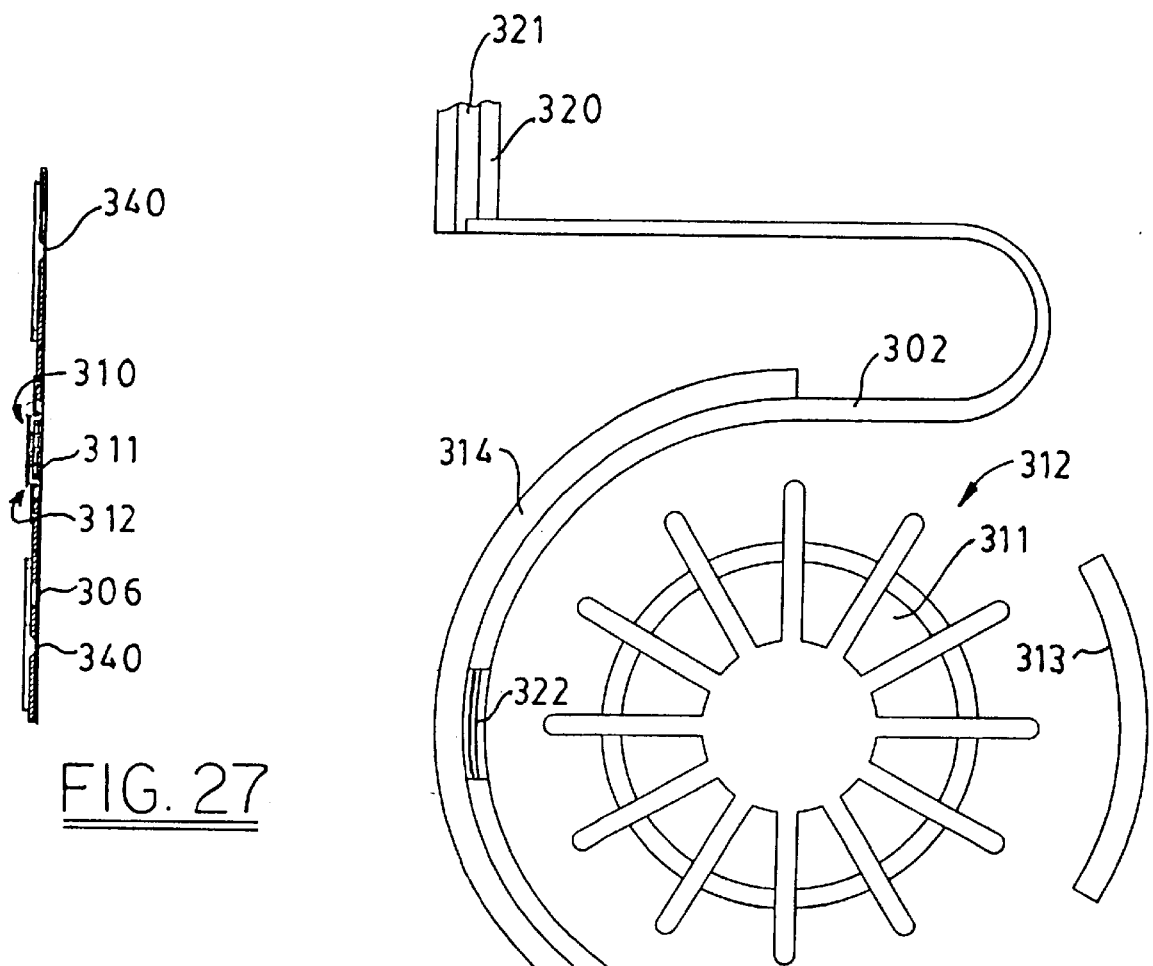
FIG. 27 is a cross section of the carrier plate taken along line 27—27 of FIG. 21.
Figure 28:
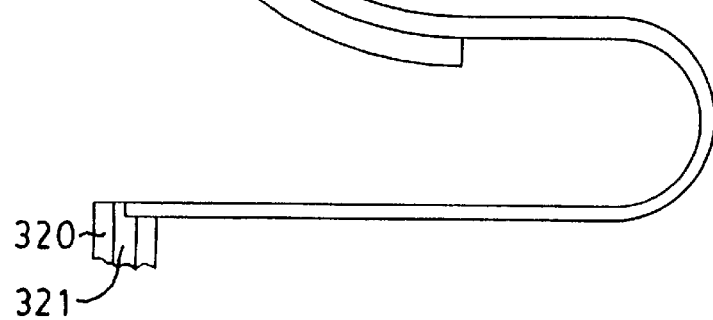
FIG. 28 is a close-up view of the top area of the carrier plate of FIG. 21 around the disc holding device.
Figure 29:
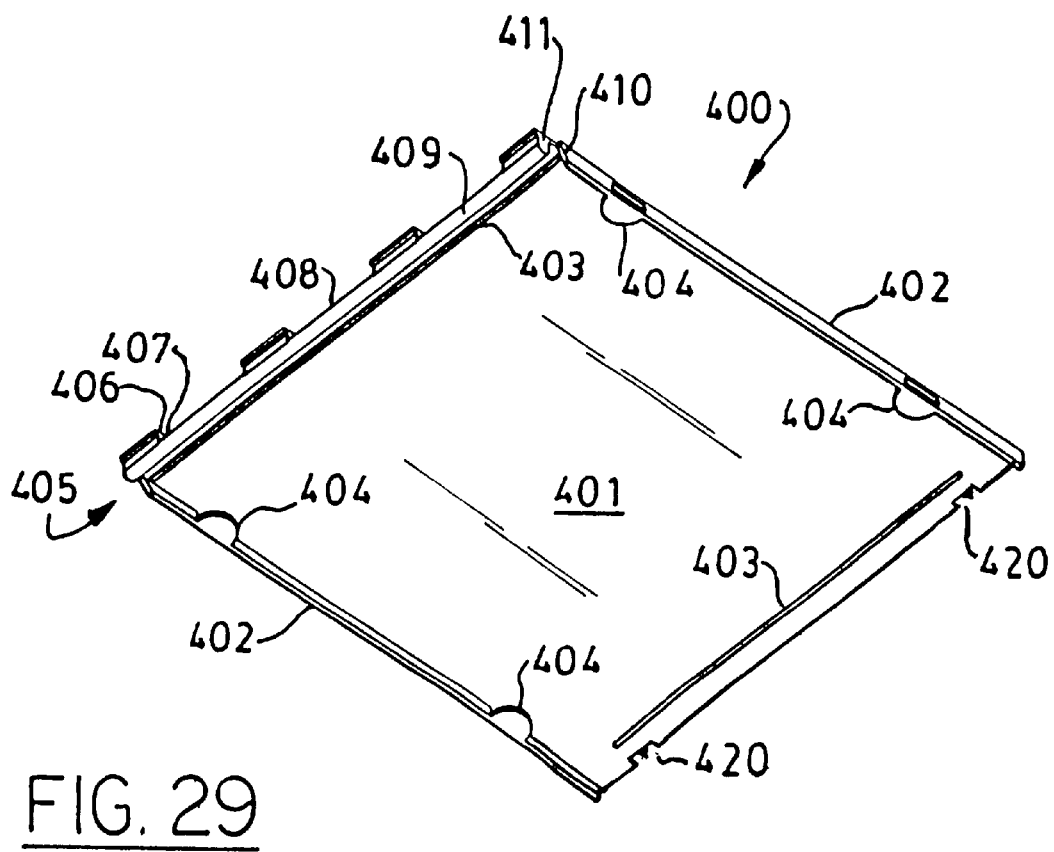
FIG. 29 is a bottom elevational view of the cover of and embodiment of the invention.
Figure 34:
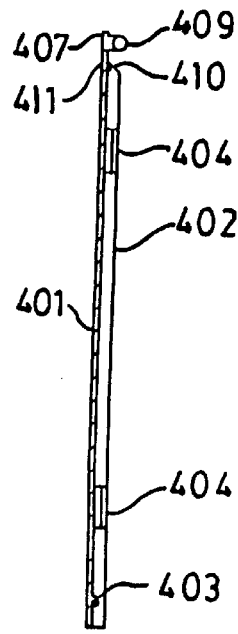
FIG. 34 is a cross section of the cover taken along line 34—34 of FIG. 30.
Figure 35:
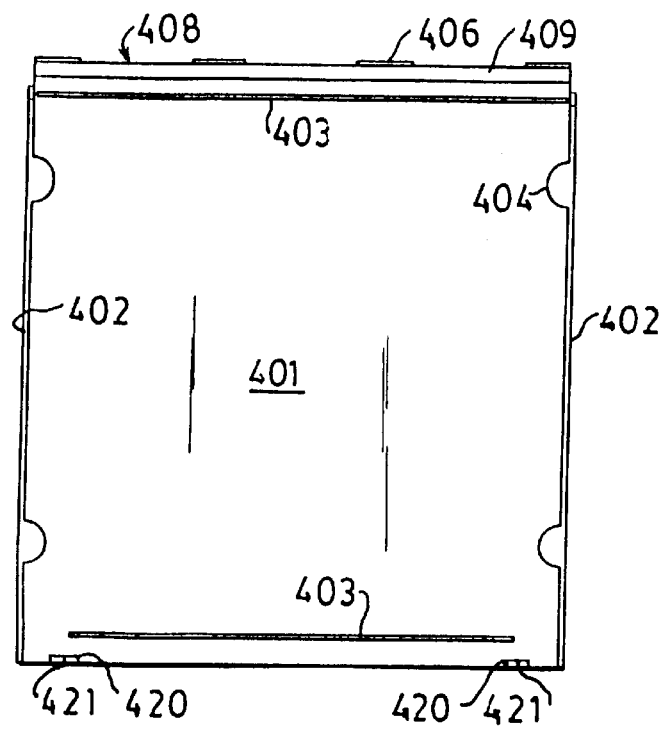
FIG. 35 is a bottom view of the cover of FIGS. 29 and 30.
Figure 36:
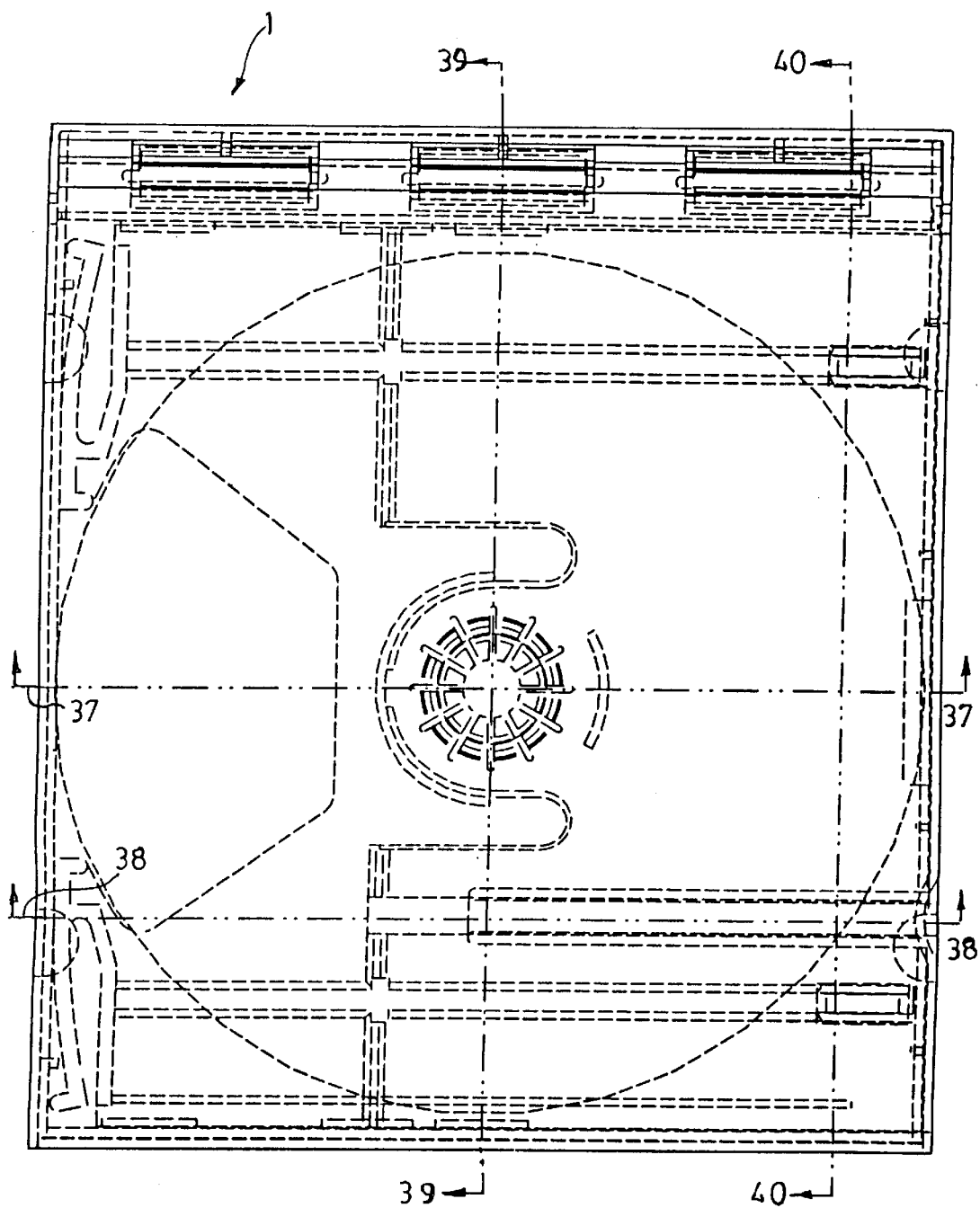
FIG. 36 is a top view of the assembled package of an embodiment of my invention showing the internal components in ghost lines.

An example of an embodiment of my inventive package 1 is shown in the accompanying Figures and is shown assembled in FIGS. 1–6 and 36–40. I will refer to the top 5, opening side 6, fixed or closed side 7, recesses 8, bottom 9, front 10, and back or rear 11 of the package 1. As can best be seen in the FIG. 7, my new package comprises four major components: a base plate 100, a support plate 200, a carrier plate 300, and a cover 400. The base plate 100 holds the support plate 200, which holds and guides the carrier plate 300. The support plate 200 also holds the cover 400 through a pivot connection as is described below.

I will describe the invention in the context of disc-shaped storage media ("discs"), such as CDs and DVDs; but many aspects of my invention can be used with other types of storage media as well. With particular reference to FIGS. 8–11, I form the base plate 100 of my inventive package 1 with a bottom wall 101 that forms the bottom 9 of the package, a complete side wall 102, a partial side wall 103, a front wall 104, and a back wall 105. The side walls 102, 103 each include a raised portion 107 near the back wall 105 that engages the cover 400 near the pivot connection. I prefer to form the raised portions 107 of the side walls 102, 103 at substantially the same elevation as the back wall 105. I also prefer to form inclined portions 108 of the side walls 102, 103 leading to the raised portions 107. As can be seen in the Figures, the partial side wall 103 extends only a short distance from the front and back walls 104, 105 so that the major portion of that side of the package 1 is open and comprises an opening side 6 of the package. This configuration allows for sliding of the carrier plate 300 out of and into the package 1 as will be described. The front wall 104 is preferably formed with a height substantially the same as that of the back wall 105 and the raised portions 107 of the side walls 102, 103. The bottom wall 101 includes projections 109 extending from its lower surface near the back wall 105 that can be inserted into mating recesses 8 in the top 5 of another package 1 of the same type to allow secure stacking of the packages 1. When the base plate 100 of my invention is compared to the bottom cover of the "standard" CD package, it can be seen that the two are similar in configuration. However, my base plate 100 differs in that one side wall 102 is complete, while the other side wall 103 has a wider opening than would be present in the bottom cover of the "standard" jewel case. Also, the front 104, back 105, and raised portions 107 of the side walls 102, 103 are preferably higher than the "standard" CD jewel case to accommodate my sliding carrier plate 300. The increase in height should not be enough to cause problems with most units designed to store such jewel cases.

The base plate 100 holds the support plate 200 via an interference or press fit as is known in the art. The configuration of the two parts is similar to that of the "standard" CD jewel case bottom cover and CD carrier. As shown in FIGS. 12–20, the support plate 200 includes a bottom wall 201, a front wall 202, a partial side wall 203, an open side 204, and a back wall 205 that separates a hinge portion 250 of the support plate 200 from the rest of the support plate 200. The partial side wall 203 includes extensions 206 from the front and back walls 202, 205 that engage parts of the biasing mechanism 330 as will be described. The front and back walls 202, 205 include carrier support projections 207 extending parallel to the bottom wall 201 that help prevent the carrier plate 300 from exiting the package 1 when the cover 400 is opened. The support projections 207 also guide the carrier plate 300 when it slides out of and into the package 1. In the preferred embodiment, the carrier plate 300 may have a shape memory resulting from the materials and methods used in its manufacture. Thus, the support projections 207 can also prevent the carrier plate 300 from bending or warping when it is inside the package.

The support plate 200 is sized to fit within the base plate 100 snug against the side walls 102, 103, but can be formed with small gaps between the support plate 200 and base plate 100 at the front and back ends 10, 11 of the package 1 as best seen in FIGS. 37–40. I prefer to include projections 253 on the support plate 200 and joined to hinge pin receptacles 251 that engage an overhang or undercut 106 on the back wall 105 of the base plate 100 upon insertion of the support plate 200 into the base plate 100 to more securely hold the support plate 200 in place. The projections 253 prevent accidental removal of the support plate 200 from the base plate 100 and also serve to hold the hinge together as will be described. Tabs of a C-card (not shown) placed between the base plate 100 and the support plate 200 before insertion of the support plate 200 into the base plate 100 extend through the gaps at the front and back ends 10, 11 of the package 1. The body of the C-card occupies a card cavity 4 between the support and base plates 200, 100 created by small projections 209 extending from the sides 203, 204 of the support plate 200 and bearing on the base plate 100 adjacent the base plate side walls 102, 103. The card cavity 4 is preferably sized to allow space between the card and the support 200 and/or base plate 100, thus allowing deflection of the support plate 200 toward the base plate 100 during one preferred manner of operation of the automatic disc release mechanism as will be described.

The support plate bottom wall 201 extends beyond the back wall 205 of the support plate 200 into a hinge area 250 as best seen in FIGS. 17–20, 39, and 40. Hinge pin receptacles 251 formed on the hinge area 250 of the support plate 200 extend toward the cover 400 and are configured to receive a hinge pin 409 formed on the cover 400. Each hinge pin receptacle 251 includes a facing pair of receptacle bodies 252 of substantially identical cross section that can expand for insertion of the hinge pin 409 when the support plate 200 is outside of the base plate 100. For additional strength, reinforcing ribs 254 can be included between the receptacle bodies 252 and the bottom wall 201 of the support plate 200. One receptacle body 252 of each pair has a projection 253, as mentioned above, that comprises a support plate interlock. The projection 253 extends toward the cover 400 and snaps under the overhang or undercut 106 of the base plate back wall 105, thus holding the rear of the support plate 200 in the base plate 100. The projections 253 also prevent expansion of the hinge pin receptacles 251 once the support plate 200 is inserted into the base plate 100, thus locking the hinge pin 409 within the hinge pin receptacles 251 after assembly of the support and base plates 200, 100. The reinforcing ribs 254 and projections 253 stiffen the hinge pin receptacles 251 against such expansion by their engagement with the base plate 100 and its undercut 106. The hinge pin receptacles 251 and their projections 253 are held against compression by hinge pin 409, which helps secure the support plate 200 within the base plate 100. In my preferred embodiment, I use a plurality of hinge pin receptacles 251 spaced to mesh with cover projections 406 so that each receptacle 251 is adjacent one or more projections 406.

I prefer to form carrier guides 208 on the support plate bottom wall 201 near the edge of the support plate 200 corresponding to the partial wall 103 of the base plate (the opening side 6 of the package). The carrier guides 208 have a cross section that allows retention of the carrier plate 300 against the support plate 200 while also allowing sliding of the carrier plate 300 parallel to the support plate 200. I prefer to use a dovetail cross section for the carrier guides 208 so that the guide 208 is narrower at its base on the upper surface of the support plate than it is at its top. I also form a portion of a carrier plate locking mechanism 210 on the bottom wall 201 of the support plate 200. This part is a long tab 211 extending from a central region of the bottom wall 201 toward the opening side 6 of the package 1. The tab 211 is molded with an upward curvature so that it extends through a tab slot 306 formed in the carrier plate 300 when the package 1 is assembled. The tab 211 includes a latch 212 on its tip that interacts with the carrier plate 300 as will be described.

As can be seen in FIGS. 2–7, 21–27, and 36–42, the carrier plate 300 is sized to fit between the front and back walls 202, 205 of the support plate 200, as well as between the bottom wall 201 of the support plate 200 and the carrier support projections 207. With particular reference to FIGS. 21–27, I form the carrier plate 200 with a side wall 301 along an external side of the carrier plate 300. When the carrier plate 300 is substantially fully inserted into the package 1, the side wall 301 of the carrier plate 300 abuts the edge of the open side 204 of the support plate 200 and completes a closed side of the package 1 in cooperation with the partial side wall 103 of the base plate 100 and a side wall 102 of the cover 100.

I prefer to form the carrier plate 300 with a centrally located disc holding device or mechanism 310 particularly suited for use with disc-shaped pieces of storage media (discs) and based on the "standard" device. As best seen in FIGS. 28 and 41–43, a series of radially arranged fingers or tabs 311 form a raised cylinder 312 that can be inserted into a center hole 3 of a disc 2, such as a compact disc, with an interference fit as is known in the art. However, my fingers 311 include base portions 315 that extend below the carrier plate 300 to form part of an automatic disc release mechanism as will be described below.

The carrier plate 300 also carries outer and inner arcuate projections 313, 314 that keep the surface of the stored disc 2 from contacting the upper surface of the carrier plate bottom wall 301. The arcuate projections 313, 314 are configured to engage a non-recorded portion of the disc 2 to avoid damaging the stored data. A hinge 320 allows an outer portion 309 of the carrier plate 300 to bend down upon extension from the package 1 beyond a predetermined point. The hinge 320 is preferably a living hinge that bends easily in one direction, but offers resistance if bent in the opposite direction. The living hinge 320 is formed such that a thin layer of material 321 is present on the bottom surface of the carrier plate 300 after molding and lies transverse to the direction in which the carrier plate 300 slides. The hinge 320 does not extend straight across the complete width of the carrier plate 300, however. Rather, I prefer to stop the hinge 320 some distance from either side of the disc holding device 310. At that point, I form a gap 302 in the carrier plate to shape two finger-like portions 303 that, when the carrier plate 300 is folded and the disc holding device 310 is disengaged, support the disc 2 should it fall off the inner arcuate projection 314. The gap 302 follows the inner arcuate projection 314 except for a portion of the plate 300 nearest the line of the hinge that I form as a portion 322 of the hinge.

I prefer to form a recessed portion 304 of the side wall 301 of the carrier plate 300 corresponding to the location of the tab 211 of the locking mechanism 210 as shown particularly in FIGS. 2–5, 7, 21, 26, and 36. A hole 305 in the recessed portion 304 receives the tab 211 and allows the latch 212 to engage the side wall 301 when the carrier plate 300 is substantially completely inserted into the package 1. When a user wishes to release the locking mechanism 210, he or she simply pushes the latch 212 out of engagement with the side wall 301, which allows the carrier plate 300 to slide out of the package 1.

I also form a biasing mechanism 330 as part of my carrier plate 300. On each corner 307 of the interior side of the carrier plate 300, I form a flexible, resilient, substantially U-shaped arm 331. I form the arms 331 so that they extend beyond the space they actually have within the package when the carrier plate 300 is inserted into the package. When the carrier plate 300 is inserted into the package 1, the arms 331 bear against the support plate partial side wall extensions 206. Thus, the arms 331 are compressed when the carrier plate 300 is locked in place and bias the carrier plate 300 toward extension. When a user releases the locking mechanism 210, the biasing arms 331 push the carrier plate 300, causing it to extend slightly from the package 1. The user can then pull the carrier plate 300 to its fully extended position in which the disc 2 is readily accessible. Stops 318 extending from the innermost portions of the U-arms 331 provide support for the disc 2, preventing it from being inserted too far into the package 1 when the drawer is extended and guiding replacement of the disc 2 when the cover 400 is open.

I reduce the amount of material required to make the carrier plate 300 by forming its interior portion 308 with a large amount of open space. While intuition suggests that this would weaken the carrier plate 300, 1 have found that, due to the nature of the preferred materials I use to make the carrier plate 300, the opposite is true. Thus, the resulting carrier plate 300 is stronger, lighter, and less expensive. The guides 208 on the support plate 200 mate with carrier slots 340 that extend from the side wall 301 of the carrier plate 300 to the biasing arms 331. I include the guides 208 to help prevent the carrier plate 300 from falling out of the package 1 when the cover 400 is opened and to ensure that the carrier plate 300 follows a desired path. The carrier slots 340 preferably include a widened portion or chamfer 341 for easier placement of the carrier plate 300 on the support plate 200 via the guides 208 and slots 340. In the preferred embodiment, the carrier slots 340 should be formed with a dovetail cross section so that they are narrower at the lower surface of the carrier plate 300 than they are at the upper surface of the carrier plate 300.

The cover 400 of my package 1 includes a top wall 401 and two side walls 402 as seen in FIGS. 1–7 and 29–40. The front edge of the top wall 401 rests atop the front wall 104 of the base plate 100 when the package 1 is closed, with one cover side wall 402 resting on the side wall 102 of the base plate 100 and the other cover side wall 402 resting on the partial side wall 103 of the base plate 100 and the side wall 301 of the carrier plate 300. I prefer to form the side walls 402 with recessed portions 411 and inclined surfaces 410 corresponding to the preferred raised portions 107 and inclined surfaces 108 of the base plate side walls 102, 103. I include tabs 404 extending from the cover side walls 402, as well as front and back projections 403 on the cover top wall lower surface, to hold the "standard" informational booklet that is typically packaged with discs such as CDs and DVDs.

The back region 405 of the top cover 400 includes parts of my inventive hinge mechanism. I form the hinge pin 409 extending from the top wall lower surface and supported by hinge pin supports 407 also extending from the top wall lower surface on projections 406 of the top wall 401. I prefer to form the top wall 401 with gaps 408 between the hinge pin support projections 406 that, when the package 1 is assembled and closed, form recesses 8 in the top 5 of the package. The recesses 5 are shaped to receive the projections 109 of the base plate 100 of a package 1 of the same type so that a user can stack the packages 1 more securely, yet has easy access to the contents via the sliding carrier plate 300. As a result of the formation of the hinge pin 409 as part of the cover 400, the cover 400 is attached to the support plate 200, rather than to the base plate 100 as one might expect when comparing my package 1 with the prior art. This arrangement serves to lock the hinge pin 409 into place and cover 400 firmly in place, as well as to lock the support plate 200 within the base plate 100. The resulting package 1 has greater structural integrity than prior art packages.

As mentioned above, I prefer to include a disc release mechanism that automatically secures and releases the stored disc onto the carrier plate 300. My automatic disc release mechanism includes the disc holding device 310, the support plate 200 (specifically, its bottom wall 201), and the ramp 213 formed along the open side 204 of the support plate 200. As mentioned above, the fingers 311 of the disc holding device 310 include base portions 315 that extend below the carrier plate 300. The fingers 311 also include upright or vertical portions 316 and top, upper, or horizontal portions 317. The base portions 315 extend far enough below the carrier plate 300 that they engage and interfere with the support plate bottom wall 201 when they are inside the package 1. I have found that an interference on the order of some thousandths of an inch is adequate for my purposes. The ramp 213 is positioned on the edge of the support plate 200 so that the disc holding device 310 travels over the ramp 213 as the carrier plate is extended from or inserted into the package 1.

Figure 41:
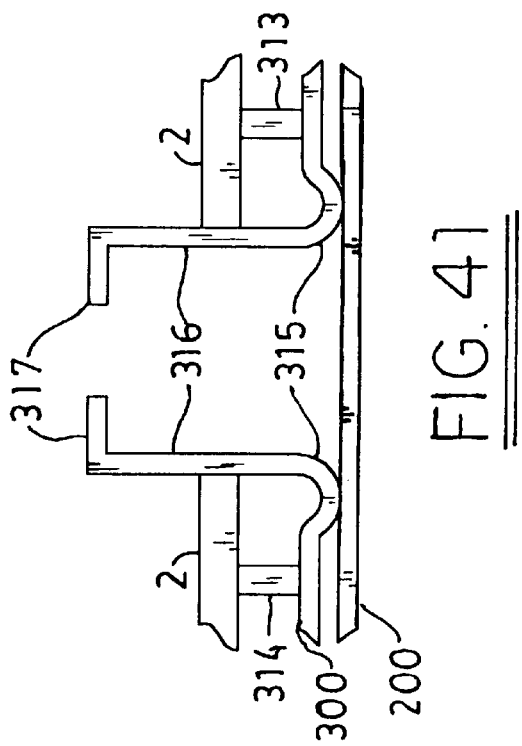
FIG. 41 is a close-up schematic of the disc holding mechanism illustrating the positions of the fingers in the disc holding configuration according to the invention.

The disc holding device 310 can assume two primary configurations: a disc holding configuration in which the disc 2 is secured to the carrier plate 300, and a disc releasing configuration in which the disc 2 can be removed from the carrier plate 300. In the disc holding configuration, the base portions 315 of the fingers 311 engage and interfere with the support plate bottom wall 201. The interference between the base portions 315 and the support plate 200 forces the upright portions 316 up and out as shown in FIG. 41. This in turn forces the outer surfaces of the upright portions 316 against the inner surface of the center hole of the stored disc 2, securing the disc 2. The disc holding device 310 assumes the disc holding configuration when it is between the ramp 213 and the complete side wall of the base plate 100.

Figure 42:
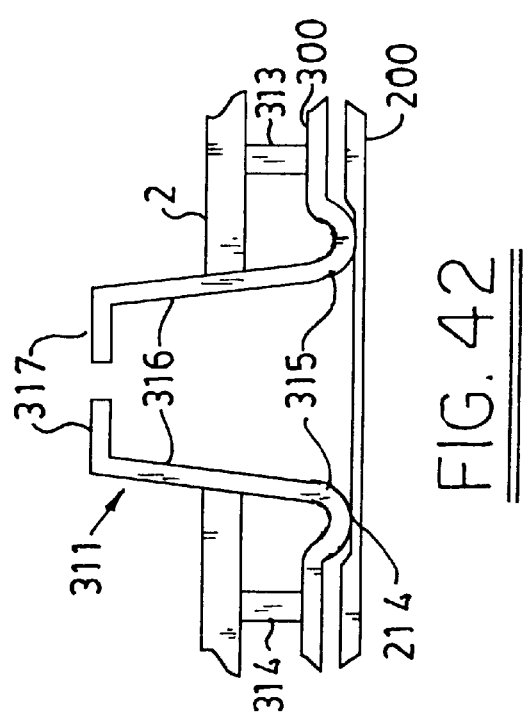
FIG. 42 is a close-up cross sectional schematic of the disc holding mechanism illustrating the positions of the fingers in the disc holding configuration when they are over the recess according to the invention.
Figure 43:
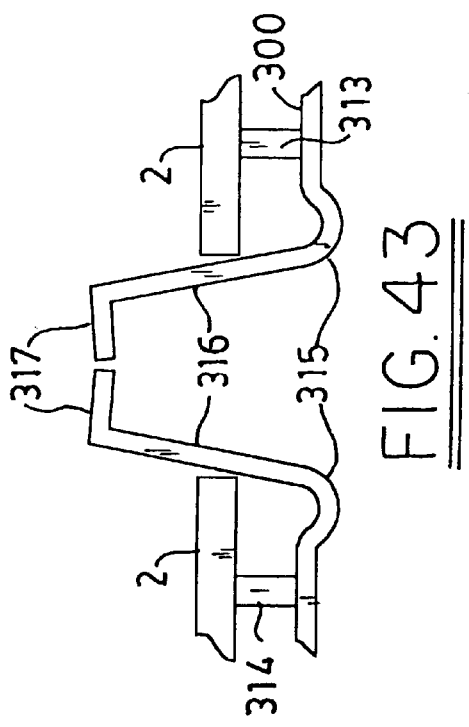
FIG. 43 is a close-up cross sectional schematic of the disc holding mechanism illustrating the positions of the fingers in the disc releasing configuration.

In the disc releasing configuration, the interference between the fingers 311 and the support plate bottom wall 201 is eliminated, causing the fingers 311 to completely relax and release the disc 2 as shown in FIG. 43. Once the fingers 311 have completely relaxed, the disc 2 can be removed with little, if any, resistance. The disc holding device 310 assumes the disc releasing configuration when it is outside the package 1. The disc holding device 310 can also assume the disc releasing configuration if the package 1 is configured to release the disc 2 when the cover 400 is opened. As an alternative to having the disc holding device 310 assume the disc releasing configuration in response to opening of the cover, a recess 214 can be formed on the support plate 200 as shown in FIG. 42. The recess 214, when included, is placed so that the base portions 315 of the fingers 311 lie within the recess 214 when the carrier plate 300 is fully inserted into the package 1. The depth of the recess 214 is preferably adequate to allow relaxation of the fingers 311, but not enough to completely eliminate the interference between the base portions 315 and the support plate bottom wall 201. Consequently, the disc 2 is secured to the carrier plate 300 with reduced force when the fingers 311 are over the recess 214, allowing easier removal of the disc 2 when the cover is opened by depressing the top portions 317 of the fingers 311 and lifting the edges of the disc 2.

The ramp 213 allows a gradual transition between the disc holding and disc releasing configurations of the disc holding device during carrier plate 300 extension and insertion. As the carrier plate 300 extends from the package 1, the surface of the support plate 200 effectively gets farther and farther away from the carrier plate 300, causing the interference between the fingers 311 and the support plate 200 to relax. As this interference is eliminated, the interference between the vertical portions 316 and the center hole 3 of the disc 2 is also eliminated, causing the fingers 311 to gradually release their grip on the disc 2. As the carrier plate 300 enters the package 1 from its extended position, the base portions 315 run up the ramp 213, gradually increasing the interference between the base portions 315 and the support plate 200. Thus, the interferences between the fingers 311, the support plate 200, and the disc 2 are restored upon travel of the fingers 311 within the ramp 213; and the fingers 311 hold the disc 2 in place on the carrier plate 300.

I assemble my package 1 by first mounting the carrier plate 300 on the support plate 200, then attaching the cover 400 to the support plate 200, and finally inserting the assembly into the base plate 100. To mount the carrier plate 300 on the support plate 200, I compress the biasing arms 331 of the carrier plate 300 to make the inner portion 308 of the carrier plate short enough to fit between the outermost projections 207 and the guides 208. I then bend the outer portion 309 of the carrier plate 300 up to expose the guide slots 340 and chamfers 341, if included. Then I slide the carrier plate 300 onto the support plate guides 208 from the interior of the support plate 200. If the chamfers 341 are included, I slide the carrier plate 300 onto the guides 208 at a slight angle. Once the carrier plate 300 is mounted on the guides 208, I slide the carrier plate to its fully extended position, then allow the outer portion 309 to return to its normal position. I move the carrier plate 300 back over the support plate 200 and lock it in place with the locking mechanism 210. Once mounted, the carrier plate 300 can only be removed intact by sliding the plate 300 out, holding the biasing arms 331 in their compressed position, bending the outer portion 309 up, and sliding the plate 300 off the guides 208. Even then, removal of the carrier plate 300 from the support plate 200 is not easy. Thus, it is quite difficult, if not impossible, for the carrier plate 300 to fall out of the package accidentally.

To attach the cover to the support plate, I insert the hinge pin 409 into the hinge pin receptacles 251 of the support plate. The hinge pin receptacles 251 are flexible enough to expand as the hinge pin 409 is inserted and retain the hinge pin 409 via an interference fit. Finally, I insert the assembly of the support plate 200, carrier plate 300, and cover 400 into the base plate 100 until the projections 253 on the support plate 200 engage the underside of the base plate back wall undercut 106. With the projections 253 bearing against the undercut 106 and the back wall 105, the hinge pin receptacles 251 are held in a hinge pin retaining position and will not allow removal of the hinge pin 409 without breakage of at least one part. The hinge pin 409 is securely retained within the hinge pin receptacles 251, but is free to rotate within the range of motion allowed by the interaction of the cover 400, support plate 200, and base plate 100.

In my preferred embodiment, the disc 2 can be removed by opening the cover 400 and by extension of the carrier plate 300 through the side 6 of the package. I also prefer that the automatic disc release mechanism be actuated by movement of the cover 400 as well as by extension of the carrier plate 300. When the cover 400 is closed, the interference between the disc holding device 310 and the support plate 200 is in place, causing the fingers 311 to grip the disc 2 (if present). When the cover 400 is open, the interference is removed by pushing the support and carrier plates 200, 300 slightly apart, allowing the fingers 311 of the disc holding device to relax and release the disc 2 (if present). My preferred manner of separating the plates 200, 300 is to form the hinge pin 409 with an eccentricity that forces the support plate 200 and carrier plate 300 apart. When the cover 400 approaches its fully opened position, the eccentricity of the hinge pin 409 forces the cover 400 against the overhang or undercut 106 of the base plate 100, in turn forcing the support plate 200 to deflect into the card cavity 4 toward the base plate 100. Alternatively, another portion of the cover 400, such as a projection, can bear on the support plate 200 or lift the carrier plate 300 to increase the separation between the support and carrier plates 200, 300 to relieve the interference between the disc holding device 310 and the support plate 200.

Figure 44:
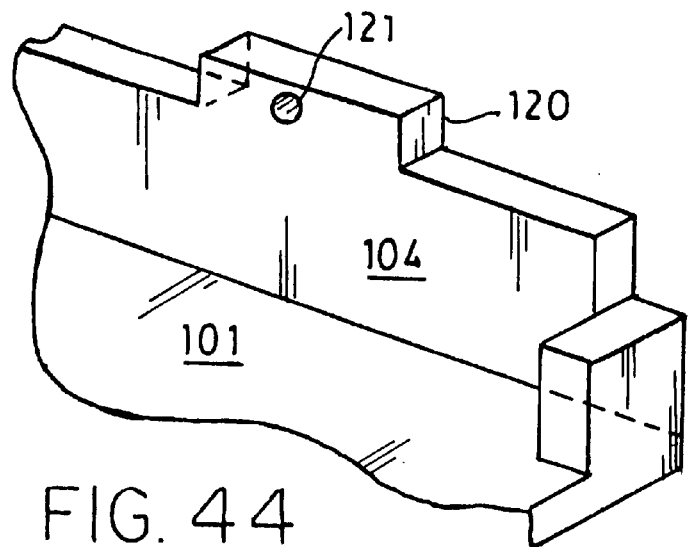
FIG. 44 is a close-up schematic of a portion of the base plate of the invention showing parts of the preferred closure mechanism in greater detail.
Figure 45:
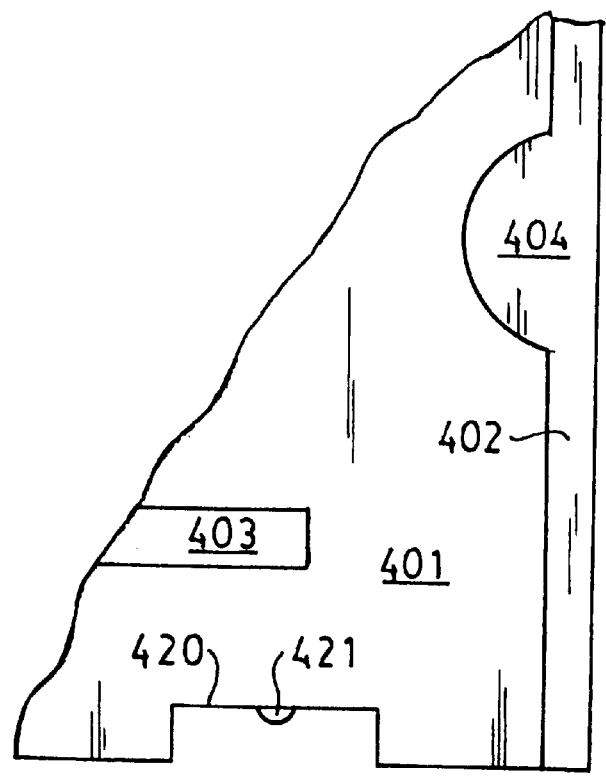
FIG. 45 is a close-up schematic of a portion of the cover of the invention showing parts of the preferred closure mechanism in greater detail.

To hold the cover 400 closed and in engagement with the base plate 100, I include a closure mechanism comprising parts on both the cover 400 and the base plate 100 as shown particularly in FIGS. 44 and 45. Closure projections 120 extend upwardly from the front wall 104 of the base plate 100 to mate with corresponding closure recesses 420 formed in the front edge of cover top wall 401. The closure projections 120 include latching recesses 121 configured to mate with corresponding latching projections 421 on the closure recesses 420. The locations of the closure projections and recesses 120, 420 could be switched, as could the locations of the latching recesses and projections 121, 421, but my preferred arrangement is more secure. I prefer to use latching recesses and projections 121, 421 of hemispherical cross section for ease of manufacture as well as for optimization of security while ensuring that users can open the jewel case 1. The closure projections 120 preferably have the same height as the thickness of the top wall 401 of the cover 400. The closure recesses 420 preferably have the same depth as the thickness of the front wall 104 of the base plate 100.

All of the parts of my inventive package are preferably formed from resinous materials, such as plastics, by injection molding. In particular, I prefer to make most of the parts from recycled polyethylene terephthalate (PET) derived from beverage bottles and from recycled polyvinyl chloride (PVC). To ensure a minimum of friction, parts that slide against each other should be made from different materials. For example, if the carrier plate 300 were made from PET, then the support plate 200 should be made from PVC. As a result of the use of recycled plastics wherever possible, I anticipate that my invention will reduce the amount of plastics deposited in landfills, thereby increasing the useful life of existing landfills and reducing the overall amount of refuse entering our environment.

PARTS LIST

1 Package
2 Disc; record; storage media; compact disc; digital video disc
3 Center hole of storage media or record or disc
4 Card cavity
5 Top of package
6 Opening side of package
7 Stationary side of package
8 Recesses of package top
9 Bottom of package
10 Front of package
11 Back or rear of package
100 Base plate
101 Bottom wall of base plate
102 Complete side wall of base plate
103 Partial side wall of base plate
104 Front wall of base plate
105 Back wall of base plate
106 Overhang or undercut of back wall of base plate
107 Raised portions of side walls of base plate
108 Inclined portions of side walls
109 Projections for interlocking with other packages
120 Closure projections
121 Latching recesses
200 Support plate
201 Bottom wall of support plate
202 Front wall of support plate
203 Partial side wall of support plate
204 Open side of support plate
205 Back wall of support plate
206 Portions of partial side wall of support plate; extensions from front and back walls of support plate for interacting with locking mechanism
207 Carrier support projections
208 Guides; carrier guides
209 Projection from bottom of support plate toward base plate
210 Locking mechanism
211 Locking tab; tab of locking mechanism
212 Latch of locking tab
213 Ramp for automatic disc release mechanism
214 Recess
250 Hinge area of support plate
251 Hinge pin receptacles
252 Receptacle bodies
253 Support plate interlock projections; projections for engaging overhang or undercut of base plate to hold support plate within base plate
254 Reinforcing ribs
300 Carrier plate
301 Side wall of carrier plate
302 Gap between inner and outer portions of carrier plate
303 Finger-like projections of carrier plate
304 Recess in side wall of carrier plate
305 Hole in carrier plate side wall for latch
306 Slot over locking tab
307 Corners of carrier plate
308 Inner portion of carrier plate
309 Outer portion of carrier plate
310 Disc holding device/mechanism
311 Tabs or fingers
312 Raised cylindrical arrangement of fingers; raised cylinder formed by fingers
313 Outer arcuate projection
314 Inner arcuate projection
315 Base or lower portion of finger
316 Upright or vertical portion of finger
317 Top, upper, or horizontal portion of finger
318 Stop for disc; disc stop
320 Living hinge
321 Thin layer of material on bottom surface of living hinge
322 Additional portion of living hinge along inner arcuate projection
330 Biasing mechanism
331 Biasing arm
340 Guide slots
341 Widened portions of guide slots; chamfers
400 Cover
401 Top wall of cover
402 Side walls of cover
403 Top wall projection for information booklet 404 Booklet tab extending from cover side wall
405 Back portion or region of top cover; hinge portion
406 Cover hinge support projection
407 Hinge pin support
408 Recesses or gaps between hinge pin support projections
409 Hinge pin
410 Inclined surfaces of cover side walls
411 Recessed portions of cover side walls
420 Closure recesses
421 Latching projections

I claim:

1. A hinge pivotably connecting a first component of a package for storage media to a second component of a package for storage media, the first component comprising a cover, the hinge comprising:
   a hinge pin formed on the cover to provide a pivot connection between the cover and the second component of the package when the package is assembled, the second component comprising a support plate inserted into a base plate of the package;
   hinge pin receptacles formed on the second component configured to receive the hinge pin and acting to lock the support plate into the base plate once the hinge pin has been inserted into the hinge pin receptacles and the support plate has then been inserted into the base plate; and
   reinforcing ribs formed between the second component and the hinge pin receptacles.

2. The hinge of claim 1 wherein the package further comprises a carrier plate configured to slide in and out of the package in a direction parallel to the hinge free from interference from the hinge.

3. The hinge of claim 1 wherein the hinge pin is retained within the hinge pin receptacles by an interaction between the hinge pin receptacles and the base plate that restricts an amount of expansion of the hinge pin receptacles to an amount insufficient to permit withdrawal of the hinge pin from the hinge pin receptacles without breakage of a component of the package.

4. The hinge of claim 1 wherein the presence of the support plate in the base plate prevents removal of the hinge pin from the hinge pin receptacles.

5. The hinge of claim 1 wherein each hinge pin receptacle comprises facing receptacle bodies of substantially identical cross section configured to retain the hinge pin therebetween.

6. The hinge of claim 1 further comprising hinge pin supports formed on the cover to support the hinge pin and to mesh with the hinge pin receptacles when the hinge pin is inserted into the hinge pin receptacles.

7. The hinge of claim 6 wherein the hinge pin supports are formed on hinge pin support projections of the cover, the cover including gaps between the hinge pin support projections that form recesses in a top of the package for receiving projections on a bottom of another package of the same type, thereby allowing secure stacking of a plurality of the packages.

8. The hinge of claim 1 wherein the hinge pin and hinge pin supports are formed as part of the cover as well as each other as a result of injection molding.

9. A hinge pivotably connecting a first component of a package for storage media to a second component of a package for storage media, the first component comprising a cover, the hinge comprising:
   a hinge pin formed on the cover to provide a pivot connection between the cover and the second component of the package when the package is assembled, the second component comprising a support plate inserted into a base plate of the package; and
   hinge pin receptacles formed on the second component configured to receive the hinge pin and acting to lock the support plate into the base plate once the hinge pin has been inserted into the hinge pin receptacles and the support plate has then been inserted into the base plate, each hinge pin receptacle comprising facing receptacle bodies of substantially identical cross section configured to retain the hinge pin therebetween.

10. The hinge of claim 9 wherein the cover further comprises hinge pin supports formed at intervals on the cover along a length of the hinge pin.

11. The hinge of claim 10 wherein the hinge pin supports are formed as part of projections of the cover, the projections extending from an edge of the cover in a plane occupied by the cover.

12. The hinge of claim 11 wherein gaps between the projections form recesses in the package when the package is assembled and the cover is closed.

13. The hinge of claim 10 wherein each support lies adjacent a receptacle.

14. The hinge of claim 9 wherein one of the support plate and the base plate carries the hinge pin receptacles, which retain the hinge pin therein, and the other of the support plate and the base plate interacts with the hinge pin receptacles to restrict and amount of expansion of the hinge pin receptacles to an amount insufficient to permit withdrawal of the hinge pin from the hinge pin receptacles without breakage of a component of the package.

15. The hinge of claim 14 wherein one of each pair of receptacle bodies includes a projection that engages the other of the support plate and the base plate, thus restricting the amount of expansion of the hinge pin receptacles.

16. A hinge pivotably connecting a first component of a package for storage media to a second component of a package for storage media, the first component comprising a cover, the hinge comprising:
   a hinge pin formed on the cover to provide a pivot connection between the cover and the second component of the package when the package is assembled, the second component comprising a support plate inserted into a base plate of the package;
   hinge pin receptacles formed on the second component configured to receive the hinge pin and acting to lock the support plate into the base plate once the hinge pin has been inserted into the hinge pin receptacles and the support plate has then been inserted into the base plate; and
   hinge pin supports formed on the cover to support the hinge pin and to mesh with the hinge pin receptacles when the hinge pin is inserted into the hinge pin receptacles.

17. The hinge of claim 16 wherein the hinge pin receptacles expand to receive the hinge pin during assembly of the package, but are prevented from expanding sufficiently that the hinge pin can exit the hinge pin receptacles once the package is assembled, thereby locking the hinge pin within the hinge pin receptacles after assembly of the package.

18. The hinge of claim 17 wherein the hinge pin receptacles are formed on one of the support plate and the base plate, and one of the hinge pin receptacles includes a projection that engages the other of the support plate and the base plate when the package is assembled to prevent expansion of the hinge pin receptacle and lock the hinge pin therein.

* * * * *